March 3, 1942.  F. H. BEHL  2,275,003
POWER TAKE-OFF UNIT
Filed Oct. 22, 1940  2 Sheets-Sheet 1
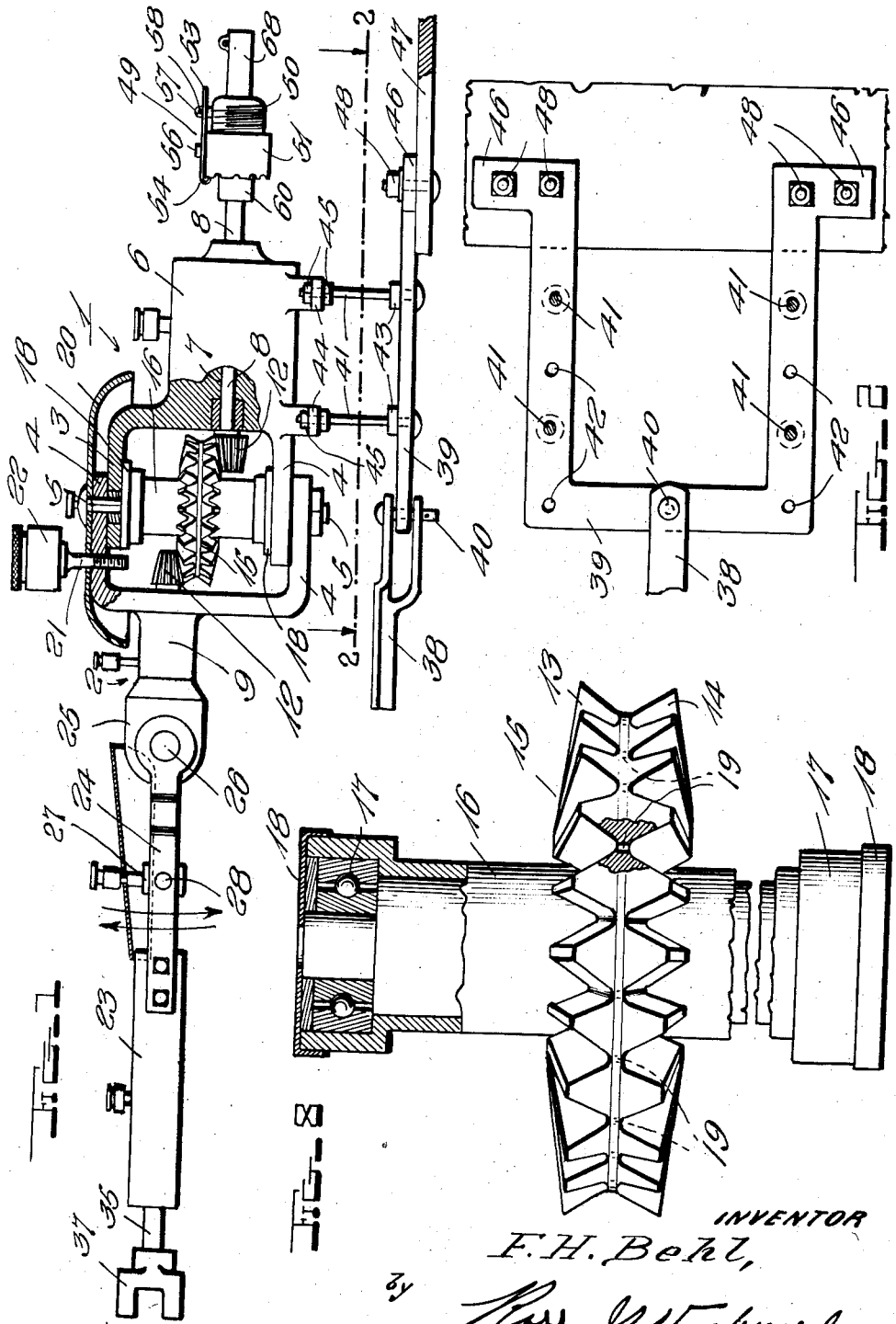
INVENTOR
F. H. Behl,
by Ross J. Woodward
Attorney

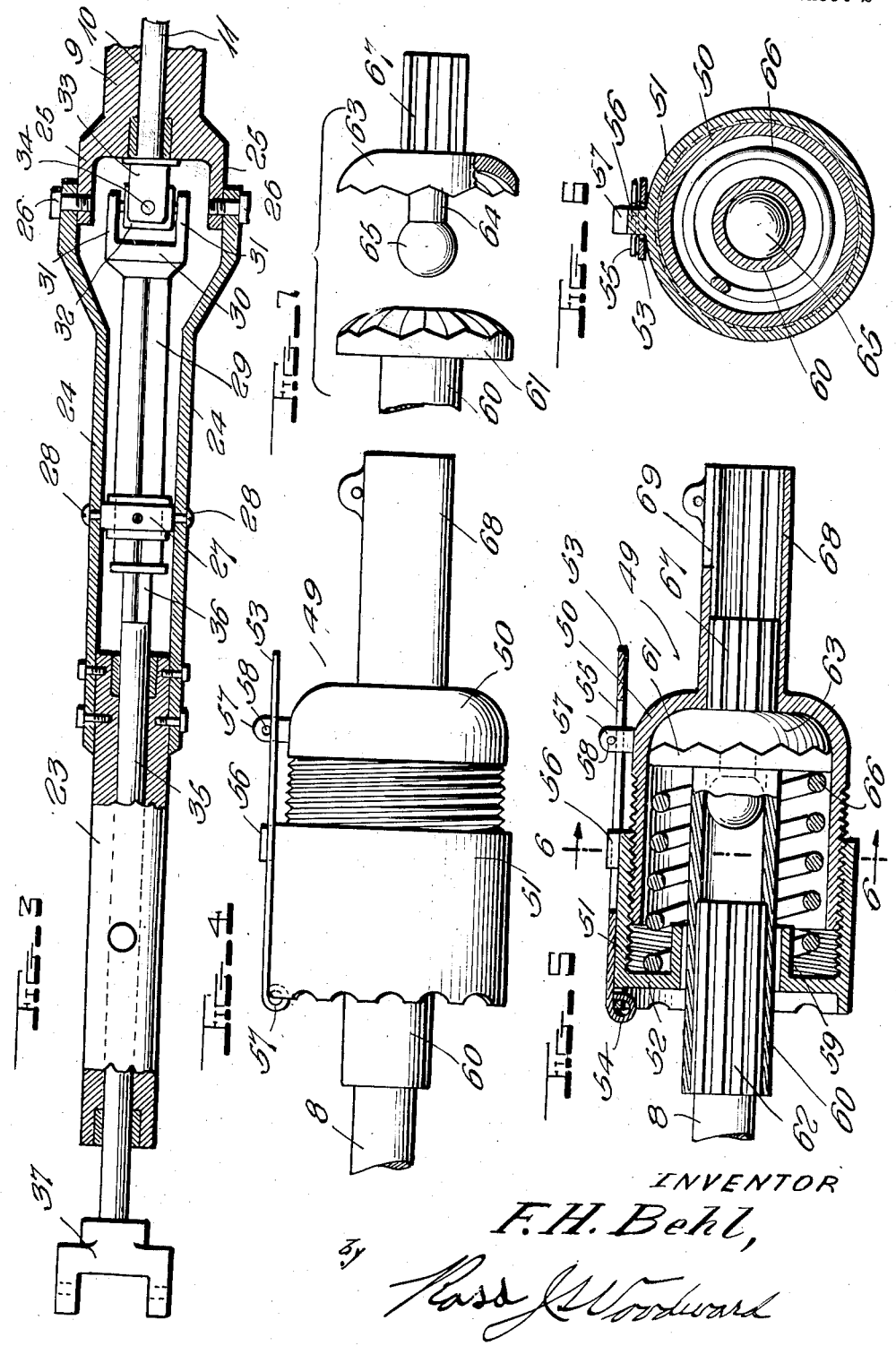

Patented Mar. 3, 1942

2,275,003

UNITED STATES PATENT OFFICE 2,275,003

POWER TAKE-OFF UNIT

Fred H. Behl, Milan, Minn.

Application October 22, 1940, Serial No. 362,294

1 Claim. (Cl. 64—1)

This invention relates to a power take off unit by means of which power may be delivered from a conventional power take off of a tractor to the drive shaft of a machine to be operated.

One object of the invention is to provide a power take off unit having an improved gearing by means of which rotary motion is transmitted from one shaft of the unit to another while at the same time allowing one section of the unit to be swung to angularly adjusted positions relative to the other section.

Another object of the invention is to so form a large gear that when a lubricant such as grease or the like is deposited upon a small gear or pinion carried by a shaft it may follow teeth of the large gear circumferentially thereof and pass through the large gear to the pinion of the other shaft and thus cause the large gear and both of the pinions to be lubricated in a very effective manner from a single source of lubricant.

Another object of the invention is to provide an improved coupling for connecting the drive shaft of the power take off device with the power take off shaft of a tractor and allow slippage under excessive strain and thus prevent elements of the power take off unit from being broken by excessive strain.

Another object of the invention is to provide the power take off device with a shaft section for connection with the drive shaft of a machine to be operated, the said shaft being so mounted that it may be shifted longitudinally and thus accommodate itself to the distance between the tractor and the drive shaft of the machine to be operated.

Another object of the invention is to provide a power take off unit which is simple in construction and very strong and durable.

The invention is illustrated in the accompanying drawings, wherein

Figure 1 is a view showing the improved power take off unit principally in side elevation and partially in section.

Figure 2 is a view taken along the line 2—2 of Figure 1 and looking down upon the base of the unit.

Figure 3 is an enlarged view of the connection between the power take off unit and the machine to be operated.

Figure 4 is an enlarged view in elevation of the coupling for connecting the front shaft of the power take off unit with the power take off shaft of a tractor.

Figure 5 is a sectional view taken longitudinally through Figure 4.

Figure 6 is a transverse sectional view taken along the line 6—6 of Figure 5.

Figure 7 is a group view of companion clutch members of the coupling.

Figure 8 is an enlarged view of the double gear of the power take off unit.

This power take off unit has front and rear sections 1 and 2 which are formed of strong metal and at their inner ends are formed with arms 3 and 4. These arms 3 and 4 overlap, as shown in Figure 1, and through overlapped portions of the arms is passed a pin or rod 5 by means of which the arms are pivoted to each other. The body 6 of the front section is bored, as shown at 7, to receive a shaft 8 which may be referred to as a drive shaft and the rear section has its body 9 formed with a bore 10 to receive a shaft 11 which may be referred to as a driven shaft. These shafts 8 and 11 have their inner end portions protruding into space between the arms of the two sections and carry beveled pinions 12 which mesh with the upper and lower teeth 13 and 14 of a large double beveled gear 15 by means of which rotary motion is transmitted from the drive shaft 8 to the driven shaft 11. Referring to Figures 1 and 8 it will be seen that the gear 15 has an elongated cylindrical hub 16 having bearings 17 at its ends held in place by sealing washers 18 which surround the rod or pin 5 to rotatably mount the large gear and permit it to turn freely. It will also be noted that the upper and lower teeth are relatively deep and between the teeth the web of the gear is formed with small openings or perforations 19 so that grease or oil may pass through the large gear between its teeth and thus permit the lubricant to reach the lower pinion. A hood or shield 20 fits about the upper end of the rod or pin and rests upon the upper arm of the rear section 2 where it is firmly held by the spout 21 of a grease cup 22 which passes through the hood and through the upper arm. This grease cup is located directly over the pinion 12 carried by the shaft 11 and when grease is discharged from the cup it drops upon this pinion. As the pinion turns, the grease or oil is deposited upon the upper teeth 13 of the large gear and then flows through the perforations 19 to the lower teeth 14 and also is deposited upon the gear 12 carried by the drive shaft 8. It will thus be seen that oil or grease delivered from the single grease cup may lubricate the two pinions and also the large double gear.

An auxiliary section 23 is disposed rearwardly of the rear section 9 and carries arms or forks 24 which extend forwardly from the auxiliary section and have their forward ends pivotally connected with the arms 25 of the rear section by screws or bolts 26. A bearing 27 is mounted between the arms 24 where it is secured by screws 28 and through this bearing extends a sleeve 29 having a head 30 at its front end. This head is formed with arms 31 pivoted to a block 32 and the rear shaft 11 is also provided at its rear end with a head 33 formed with arms pivoted to the block at right angles to the pivotal connection between the block and the arms 31. It will thus be seen that there has been provided a universal joint connection between the shaft 11 and the sleeve or tubular shaft section 29 so that rotary motion may be transmitted from the shaft 11 to sleeve 29 and at the same time allow pivotal movement of sleeve 29 relative to shaft 11. A driven shaft 35 is rotatably mounted through the auxiliary section 23 and this shaft is not only rotatable in the sleeve but also slidable longitudinally therein. The forward portion 36 of shaft 35 is squared so that when it is engaged in the similarly shaped bore of the sleeve 29 it will be turned with the sleeve. This shaft is of appreciably greater length than the auxiliary section 23 and at its rear end carries a coupler 37 by means of which it is to be connected with the drive shaft of a machine to be operated. Since the shaft 35 is slidable through the auxiliary section 23, it may be longitudinally adjusted to accommodate itself to the position of a machine back of a tractor. The member 38 constitutes means for connecting the machine to be operated back of a tractor, and referring to Figure 1 it will be seen that this member 38 is pivotally and removably connected with a draw bar 39 by means of a pin or bolt 40. The draw bar is of U-shaped formation, as shown in Figure 2, and constitutes a base for the forward member 1 of the power take off unit which is supported above it by rods or bolts 41. These rods or bolts, which may be referred to as supporting legs for the body 6 of the forward section, extend vertically through selected ones of the openings 42 formed in side arms of the draw bar 39 where they are secured by nuts 43 and the upper ends of the bolts or rods pass through feet 44 extending from opposite sides of the body portion 6 where they are secured by nuts 45. By this arrangement the power take off unit may be adjusted longitudinally of the draw bar, and, by properly adjusting the nuts 45, the unit may be shifted vertically and secured in a set position. The draw bar 39 has its feet 46 secured upon a main draw bar or other portion 47 of a tractor by bolts 48 which may be U-bolts if so desired, and it will thus be seen that the draw bar 39 constitutes a permanent base for the power take off unit which is detachably connected with the draw bar or equivalent member 47 of a tractor. When the power take off unit is not in use a machine to be drawn forwardly by the tractor may be connected thereto in any conventional manner.

When this power take off unit is in use it is to be connected with the power take off shaft of a tractor or other towing vehicle and in order to do so there has been provided a coupling, indicated in general by the numeral 49. This coupling is constructed as shown in detail in Figures 4, 5 and 6 and has a cup-shaped casing 50 which is externally threaded to receive a sleeve or cap 51 having an end wall 52. The sleeve projects beyond the wall or head 52 and carries a latch or keeper 53 which is pivotally mounted through the projecting portion of the sleeve, as shown at 54, and is formed with a longitudinally extending slot 55 to accommodate the lugs 56 and 57 which project laterally from the sleeve and the cup-shaped casing. When the latch or keeper is swung to the position shown, the sleeve will be prevented from turning upon the cup-shaped casing, but when the pin or equivalent fastener 58 is removed, the latch may be swung outwardly to an inoperative position permitting the sleeve to be turned about the casing to an adjusted position and then again secured by the latch. The short tubular neck 59 extends inwardly from the head 52 and through this neck passes the tubular shank 60 of a clutch member 61. This clutch member has its shank 60 formed with internal ribs for engagement with the external ribs 62 of the shaft 8 so that the shank may have longitudinal movement upon the shaft but at the same time cause the shaft to turn with it. The companion clutch member 63 is formed with a neck 64 which passes through the center of the clutch member 61 and terminates in a spherical head 65 which is received in the forward portion of the tubular shank 60, and referring to Figure 5 it will be seen that the clutch member 61 is yieldably held in gripping engagement with the clutch member 63 by a spring 66 which is housed in the casing 50 with its rear portion disposed about the neck 59 of the cap or sleeve 50. By adjusting the sleeve upon the casing, the tension of the spring may be controlled and the ease with which slippage may take place between the clutch members controlled. The shank 67 of the clutch member 63 is formed with ribs which engage companion ribs formed within the tubular shank 68 of the casing 50 which projects forwardly and is split longitudinally, as shown at 69, in order that it may be clamped about the power take off shaft of a tractor.

When this power take off unit is in use it is applied to the draft bar or other suitable portion of a tractor and the shank or neck 68 firmly secured to the power take off shaft of the tractor. The shaft 35 is then adjusted longitudinally through the auxiliary member 23 of the unit and its head 37 connected with the driving shaft of a machine to be operated. The machine will be towed back of the tractor or remain stationary back of a tractor in a standing position. Rotary motion is transmitted from the power take off shaft of the tractor through the coupler 49 to the shaft 8 of the power take off unit and transmitted from this shaft to the shaft 11 through the medium of the double gear 15 and the pinions 12. Under normal conditions, the teeth of the two coupler members 61 and 63 remain in engagement so that the rotary motion will be transmitted to the shaft 8. If, however, operation of the machine back of the tractor is suddenly stopped by jamming or the like, the teeth of the coupler member 63 may slide over the teeth of the coupler member 61 and mechanism of the machine to be operated will not be damaged.

Having thus described the invention, what is claimed as new is:

A power take off unit including front and rear casing sections, a shaft journaled through the front casing section, arms extending forwardly from the rear casing section and pivoted to the rear end of the front casing section, a sleeve extending longitudinally between said arms, a universal joint connecting said sleeve with the rear end of said shaft, a bearing for the rear portion of said sleeve mounted between the arms, and an auxiliary shaft rotatably mounted through the rear casing section with its forward portion slidably engaged in the sleeve and held against rotation therein, the rear portion of the rear shaft being adapted for connection with the drive shaft of machinery to be operated from the power take off unit.

FRED H. BEHL.